(12) United States Patent
Kruthiveti Subrahmanyeswara Sai et al.

(10) Patent No.: US 11,893,111 B2
(45) Date of Patent: Feb. 6, 2024

(54) DEFENDING MACHINE LEARNING SYSTEMS FROM ADVERSARIAL ATTACKS

(71) Applicant: HARMAN INTERNATIONAL INDUSTRIES, INCORPORATED, Stamford, CT (US)

(72) Inventors: Srinivas Kruthiveti Subrahmanyeswara Sai, Bangalore (IN); Aashish Kumar, Bangalore (IN); Alexander Kreines, Jerusalem (IL); George Jose, Bengaluru (IN); Sambuddha Saha, Burdwan (IN); Nir Morgulis, Petah Tikwa (IL); Shachar Mendelowitz, Tel Aviv (IL)

(73) Assignee: Harman International Industries, Incorporated, Stamford, CT (US)

( * ) Notice: Subject to any disclaimer, the term of this patent is extended or adjusted under 35 U.S.C. 154(b) by 486 days.

(21) Appl. No.: 16/696,144

(22) Filed: Nov. 26, 2019

(65) Prior Publication Data

US 2021/0157912 A1    May 27, 2021

(51) Int. Cl.
*G06F 21/55* (2013.01)
*G06N 20/00* (2019.01)
*G06N 3/04* (2023.01)

(52) U.S. Cl.
CPC ........... *G06F 21/554* (2013.01); *G06N 3/04* (2013.01); *G06N 20/00* (2019.01); *G06F 2221/034* (2013.01)

(58) Field of Classification Search
CPC ......... G06F 21/554; G06N 20/00; G06N 3/04
USPC .......................................................... 726/23
See application file for complete search history.

(56) References Cited

U.S. PATENT DOCUMENTS

| 10,733,292 | B2 * | 8/2020 | Araujo | G06F 21/554 |
| 10,944,767 | B2 * | 3/2021 | Goswami | G06N 3/08 |
| 10,984,272 | B1 * | 4/2021 | Shrivastava | G06V 20/20 |
| 11,526,626 | B2 * | 12/2022 | Kuta | G06V 40/172 |
| 11,636,332 | B2 * | 4/2023 | Zhang | G06V 10/82 |
| | | | | 706/25 |

(Continued)

FOREIGN PATENT DOCUMENTS

WO    WO-2019053052 A1 *    3/2019    ........... G06N 3/0454

OTHER PUBLICATIONS

Extended European Search Report for application No. 20209924.8 dated Apr. 28, 2021.

(Continued)

*Primary Examiner* — Dereena T Cattungal
(74) *Attorney, Agent, or Firm* — Artegis Law Group, LLP

(57) ABSTRACT

Techniques are disclosed for detecting adversarial attacks. A machine learning (ML) system processes the input into and output of a ML model using an adversarial detection module that does not include a direct external interface. The adversarial detection module includes a detection model that generates a score indicative of whether the input is adversarial using, e.g., a neural fingerprinting technique or a comparison of features extracted by a surrogate ML model to an expected feature distribution for the output of the ML model. In turn, the adversarial score is compared to a predefined threshold for raising an adversarial flag. Appropriate remedial measures, such as notifying a user, may be taken when the adversarial score satisfies the threshold and raises the adversarial flag.

20 Claims, 7 Drawing Sheets

(56) References Cited

U.S. PATENT DOCUMENTS

| | | | | |
|---|---|---|---|---|
| 11,657,153 | B2* | 5/2023 | Condessa | G06N 3/044 |
| | | | | 726/23 |
| 2018/0165597 | A1* | 6/2018 | Jordan | H04L 43/08 |
| 2019/0130110 | A1* | 5/2019 | Lee | G06F 21/57 |
| 2019/0238568 | A1* | 8/2019 | Goswami | G06F 21/566 |
| 2019/0362269 | A1* | 11/2019 | Barad | G06F 21/55 |
| 2020/0005133 | A1* | 1/2020 | Zhang | G06N 3/0454 |
| 2020/0019699 | A1* | 1/2020 | Araujo | G06N 3/08 |
| 2020/0045063 | A1* | 2/2020 | Zhang | G06N 3/08 |
| 2020/0201993 | A1* | 6/2020 | Anders | G06F 21/56 |
| 2020/0250304 | A1* | 8/2020 | Kruus | G06N 3/08 |
| 2020/0302287 | A1* | 9/2020 | Tachibana | G06N 3/04 |
| 2020/0311481 | A1* | 10/2020 | Tong | G06V 10/774 |
| 2020/0327238 | A1* | 10/2020 | Wang | G06F 21/577 |
| 2020/0342306 | A1* | 10/2020 | Giovannini | G06N 3/0454 |
| 2020/0410228 | A1* | 12/2020 | Wang | G06V 10/82 |
| 2021/0012188 | A1* | 1/2021 | Zhang | G06N 3/088 |
| 2021/0019399 | A1* | 1/2021 | Miller | G06F 17/18 |
| 2021/0056404 | A1* | 2/2021 | Goswami | G06V 10/764 |
| 2021/0089957 | A1* | 3/2021 | Ermans | G06N 20/00 |
| 2022/0147620 | A1* | 5/2022 | Takahashi | G06N 3/0454 |
| 2022/0156563 | A1* | 5/2022 | Zhang | G06N 3/0454 |
| 2022/0172061 | A1* | 6/2022 | Willmott | G06K 9/6256 |

OTHER PUBLICATIONS

He et al., "VerIDeep: Verifying Integrity of Deep Neural Networks through Sensitive-Sample Fingerprinting", arxiv.org, arxiv: 1808.03277, XP081097372, Aug. 9, 2018, pp. 1-15.

Rouhani et al., "DeepFense: Online Accelerated Defense Against Adversarial Deep Learning", Computer-Aided Design, ACM, XP058417758, DOI: 10.1145/3240765.3240791, ISBN: 978-1-4503-5950-4, Nov. 5-8, 2018, pp. 1-8.

Papernot et al., "Practical Black-Box Attacks against Deep Learning Systems using Adversarial Examples", arxiv.org, arxiv: 1602.02697v2, XP080682288, Feb. 8, 2016, 16 pages.

https://www.theverge.com/2017/4/12/15271874/ai-adversarial-images-fooling-attacks-artificial-intelligence, 8 pages.

Towards deep learning models resistant to adversarial attacks. arXiv preprint arXiv:1706.06083 (2017), 28 pages.

Detecting Adversarial Examples via Neural Fingerprinting. arXiv preprint arXiv:1803.03870(2018), 18 pages.

On the (statistical) detection of adversarial examples. arXiv preprint arXiv: 1702.06280(2017), 13 pages.

Practical black-box attacks against machine learning. Proceedings of the 2017 ACM on Asia Conference on Computer and Communications Security. ACM, 2017, 2 pages.

Towards evaluating the robustness of neural networks. https://arxiv.org/pdf/1608.04644.pdf, 19 pages.

\* cited by examiner

DEFENDING MACHINE LEARNING SYSTEMS FROM ADVERSARIAL ATTACKS

BACKGROUND

Technical Field

The present disclosure relates generally to machine learning systems and, more specifically, to defending machine learning systems from adversarial attacks.

Description of the Related Art

Machine Learning (ML) has revolutionized many industries and given rise to entirely new product domains, such as virtual personal assistants and self-driving cars. However, one drawback of traditional ML systems is that these systems are often times vulnerable to attacks using adversarial inputs. Such adversarial inputs may be generated by modifying original data input into a ML system, which can cause the ML system to misrecognize the data. For example, subtle modifications made to the visual appearance of a traffic sign could cause a ML system in an autonomous vehicle to misrecognize the traffic sign as another type of sign, which, in turn, could lead to an accident.

The susceptibility of traditional ML systems to adversarial attacks limits the applications of such systems. For example, vulnerable ML systems cannot be deployed in products, such as autonomous vehicles and malware detection applications, where safety and/or security are critical.

As the foregoing illustrates, what is needed in the art are more effective techniques for protecting ML systems against adversarial attacks.

SUMMARY

One embodiment of the present application sets forth a computer-implemented method for detecting adversarial attacks on a machine-learning (ML) system. The method includes processing data via a ML model included in the ML system to generate output data. In addition, the method includes processing, via an adversarial detection module included in the ML system, the data input into the ML model and the output data to determine whether the data input into the ML model is adversarial. The adversarial detection module does not include an interface that is accessible outside of the ML system.

Another embodiment of the present application sets forth a non-transitory computer-readable storage medium including instructions that, when executed by a processor, cause the processor to perform steps for detecting adversarial attacks on a machine-learning (ML) system. The steps include processing data via a ML model included in the ML system to generate output data. The steps further include processing, via an adversarial detection module that is included in the ML system and does not include an interface accessible outside of the ML system, the data input into the ML model and the output data to determine whether the data input into the ML model is adversarial. In addition, the steps include performing one or more remedial actions if the data input into the ML model is determined to be adversarial.

Another embodiment of the present application sets forth a system that includes a memory and a processor. The memory stores a machine learning (ML) system comprising a ML model and an adversarial detection module. The adversarial detection module does not include an interface that is accessible outside of the ML system. The processor is coupled to the memory and configured to process at least one input into and output of the ML model using the adversarial detection module to determine whether the at least one input into the ML model is adversarial.

At least one technical advantage of the disclosed techniques relative to the prior art is that, in the disclosed techniques, an adversarial detection module in a ML system is implemented without a direct external interface. Thus, the adversarial detection module is not accessible outside the ML system. As a result, potential attackers cannot access the adversarial detection module or a detection model within the adversarial detection module, making the adversarial detection module difficult to compromise. Further, the plugin-in nature of the adversarial detection module allows such a module to be deployed to defend a variety of learning-based ML models, while being developed and updated independently of those ML models. In addition, because of the general inaccessibility of the adversarial detection module, the disclosed techniques can be implemented in applications and products where safety and/or security are important, such as autonomous vehicles, malware detection, facial recognition, speaker detection, spam detection in emails, etc. These technical advantages represent one or more technological improvements over prior art approaches.

BRIEF DESCRIPTION OF THE DRAWINGS

So that the manner in which the above recited features of this disclosure can be understood in detail, a more particular description of this disclosure may be had by reference to embodiments, some of which are illustrated in the appended drawings. It is to be noted, however, that the appended drawings illustrate only typical embodiments and are therefore not to be considered as limiting the scope of this disclosure, which may admit to other equally effective embodiments.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

System Overview

Figure 1:
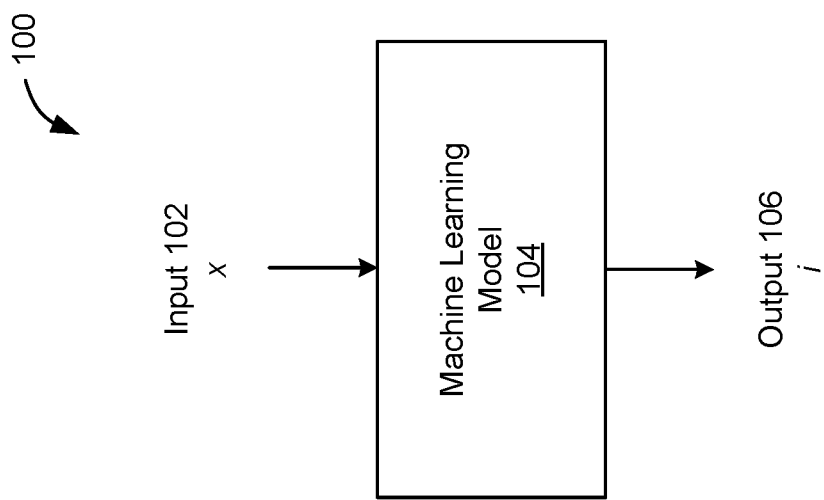
FIG. 1 is a schematic diagram illustrating a traditional machine learning (ML) system.

FIG. 1 is a schematic diagram illustrating a traditional machine learning (ML) system 100. As shown, the ML system 100 includes a ML model 104 that receives an input 102, denoted by x, and produces an output 106, denoted by i. The ML model 104 may be any technically feasible type of model, with any appropriate architecture. In some embodiments, the ML model 104 may be a deep learning model, also sometimes referred to as a "deep neural network." Other types of ML models, such as support vector machines (SVMs), boosted trees, random forests, logistic regression models, linear regression models, etc. may be used in alternative embodiments.

Any suitable type of input 102, such as image(s), sound, text, etc., may be fed to the ML model 104. Other examples of input data include microphone recordings, thermal camera images, LIDAR (Light Detection and Ranging) data, RADAR data, etc. In some embodiments, the input 102 may include a one-dimensional set of numbers, such as a sequence of numbers representing an audio signal. In other embodiments, the input may include a higher-dimensional set of numbers, such as a two-dimensional matrix of numbers representing an image.

In embodiments, the ML model 104 may be trained to output a classification and/or regression based on the input 102. The output of a ML model is also sometimes referred to as a "prediction." Although discussed herein primarily with respect to classification, in which classes (also sometimes referred to as "labels" or "categories") are predicted, it should be understood that classification is only used as a reference example and techniques disclosed herein are not limited to classification models. In the context of autonomous vehicles, the ML model 104 may, e.g., take images and/or LIDAR data as input and classify object(s) therein.

Traditional ML systems, such as the ML system 100, are susceptible to adversarial attacks. For example, subtle modifications made to the visual appearance of a traffic sign could cause a traditional ML system in an autonomous vehicle to misrecognize the traffic sign as another type of sign.

Adversarial attacks are generally classified as white box, black box, or gray box. A white-box attacker has perfect knowledge of the ML model being attacked. For example, a white-box attacker could be aware of details including the architecture of the neural network of a deep learning model, as well as the values of various parameters and hyperparameters in the network. White-box attackers can relatively easily design adversarial inputs based on their knowledge of the ML model being attacked.

A black-box attacker does not know the internal details of a ML model but may query the model using inputs to obtain outputs. Based on such input-output access to the ML model, the black-box attacker may reverse-engineer the ML model and construct a substitute model which mimics the original ML model. As the black-box attacker is aware of the details of the substitute model, he or she can generate adversarial inputs for the substitute model via the white-box attack approach. Those adversarial inputs may then be used to attack the original ML model.

A gray-box attacker has black-box access to the ML model along with knowledge of some internal details of the ML model, as opposed to the perfect knowledge that a white box-attacker would have. For example, a gray-box attacker could know that the ML model is a neural network, but not know exact details of the network architecture. Gray-box attacks are less powerful than white-box attacks but more powerful than black-box attacks. Gray-box attacks may be more common than white-box and black-box attacks.

Adversarial Detection Techniques

Figure 2:
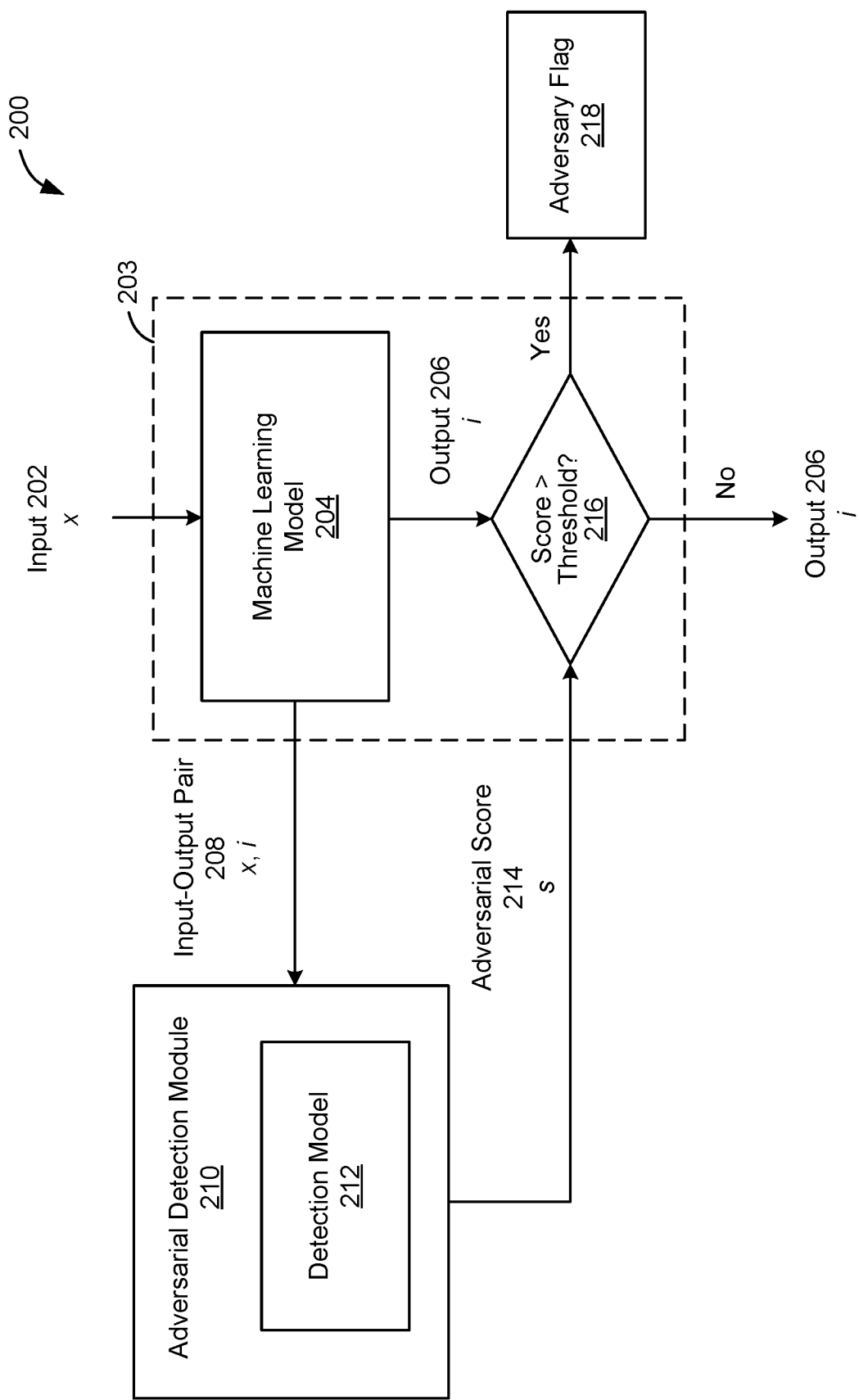
FIG. 2 is a schematic diagram illustrating a ML system that includes an adversarial detection module, according to various embodiments.

FIG. 2 is a schematic diagram illustrating a ML system 200 that includes an adversarial detection module, according to various embodiments. As shown, the ML system 200 includes a ML model 204 that receives an input 202, denoted by x, and produces an output 206, denoted by i. The ML model 204, the input 202, and the output 206 are similar to the ML 104, the input 102, and the output 106 discussed above in conjunction with FIG. 1.

In addition to the ML model 204, the ML system 200 includes an adversarial detection module 210 that is configured to take the input x and the output i of the ML model as its own input. Given such an input-output pair, the adversarial detection module 210 outputs a score indicative of whether the input x is an adversarial attack, such that the output i cannot be relied upon. In some embodiments, the adversarial detection module 210 does not include a direct external interface, such as an application programming interface (API). As a result, it is difficult for attackers to have white-box or black-box access to the adversarial detection module 210.

The adversarial detection module 210 may safeguard the ML system 200 against adversarial attacks in a model-agnostic manner that is independent of the ML model 204 and works with different types of ML models 204. This is different from traditional approaches for protecting ML systems from adversarial attacks, which rely on ML models that are robust to known adversarial attacks. Such ML models must be updated regularly as increasingly better adversarial attacks are developed. By contrast, the adversarial detection module 210 may be implemented as a plug-in type module to the rest of the ML system 203. As used herein, a "plug-in" refers to a software module that can be implemented in multiple different ML systems without modification. A plugin-type module may offer safety against attacks in a model-independent fashion, i.e., a manner independent of the ML model 204, that relies on only input-label patterns learned from training data. It should be understood the adversarial detection module 210 may be used to defend any type of learning-based ML model 204, and the adversarial detection module 210 may also be developed and updated independently of the ML model 204, without knowledge of the code of the ML model 204. In particular, changes need not be made to the ML model 204 in response to new types of adversarial attacks. As shown, the portion of the ML system 203 illustrated in ghosted lines may remain unchanged irrespective of changes made to the adversarial detection module 210, and vice versa.

As shown, the adversarial detection module 210 includes a detection model 212. The detection model 212 may be any technically feasible function that is used to verify whether an input-output pair x, i fits a pattern in training data used to train the detection model 212. An input-output pair for which the input is consistent with a pattern of inputs for the same output in the training data is unlikely to have resulted from an adversarial attack, and vice versa. That is, the adversarial detection module 210 uses the detection model 212 to assign a score to the input-output pair x, i indicating how well, given the output i, the input x matches inputs observed during training for the same output classification, which indicates whether the input x is adversarial. In some embodiments, higher scores may be assigned to input-output pairs that are inconsistent with training data (or vice versa). The ML system 200 compares the adversarial score determined by the adversarial module 210 to a predefined threshold, with the input 202 being flagged as adversarial (or not) based on whether the threshold is satisfied. In response to an adversarial flag, any suitable remedial action may be taken, such as alerting a user, asking the user to intervene, or accessing an alternative source of information to classify the input.

As discussed in greater detail below, in some embodiments, the detection model 212 may include a neural fingerprinting ML model that is fed versions of the input data x perturbed with predefined random perturbations, as well as the output i of the ML model 204, and in such a case the detection model 212 may output an adversarial score indicating whether output perturbations generated for the perturbed input data by the neural fingerprinting ML model match expected output perturbations for the output i of the ML model 204. In other embodiments, the detection model 212 may include a surrogate ML model that takes the same input as the ML model 204 and is used to extract features that are compared with an expected feature distribution for the output i of the ML model 204 to determine an adversarial score indicating whether the extracted features match the expected feature distribution. As described, the detection model 212 may generally be employed to determine whether input-output pairs x, i are consistent with a pattern in training data. In the case of neural fingerprinting, the pattern matching is based on predetermined perturbations whereas, in the case of a surrogate ML model, the pattern matching is based on how well extracted features fit an expected distribution of features.

Although neural fingerprinting and surrogate ML models are discussed herein as reference examples, it should be understood that embodiments may employ any technically feasible detection model 212 that takes an input and an output of the ML model 204 as its input and then outputs an adversarial score score=adv_score(x, i) based on whether the input-output pair is consistent with patterns observed in training data. That is, the detection model 212 may generally be any function and may include ML model(s), statistical metric computation(s), etc.

Returning to the example of neural fingerprinting, the detection model 212 may include a neural fingerprinting ML model that takes the same input as the ML model 204, but perturbed with predetermined random perturbations x+Δ, which are also referred to herein as "input perturbations." For example, the adversarial detection module 210 could perturb an image by adding small numbers (e.g., 0-5) to the pixel values (e.g., 0-255 values) at random locations within the image, and multiple (e.g., 100) such perturbations may be made. The neural fingerprinting ML model may be any technically-feasibly type of model, with any suitable architecture, such as a deep learning model, a SVM, a boosted tree, a random forest, a logistic regression model, a linear regression model, etc. The set of predetermined perturbations may be chosen at random and fixed when the neural fingerprinting ML model is trained, such that the same predetermined perturbations are also used during deployment of the trained neural fingerprinting ML model.

Given the input perturbations x+Δ, the neural fingerprinting ML model generates corresponding perturbed outputs i+Δ, which are also referred to herein as "output perturbations" and may include features produced by the neural fingerprinting ML model. As used herein, "features" produced by a ML model refers to an internal representation generated by the model for an input. In some embodiments, the detection model 212 may be trained to learn the outputs, which are also referred to herein as expected output perturbations, that are produced by the neural fingerprinting ML model after the predetermined perturbations were applied to input training data. Each input perturbation-expected output perturbation pair is also referred to herein as a "fingerprint."

The detection model 212 may employ multiple fingerprints to provide robust adversarial detection in some embodiments. Subsequent to training, the detection model 212 is configured to determine an adversarial score by measuring the error of how well output perturbations generated by the neural fingerprinting ML model for new input data that has been perturbed matches the expected perturbations for a class predicted by the ML model 204 for the new input data. A close match, which may be represented by a small error, indicates that the input data is normal as opposed to adversarial, and vice versa. The error may be quantified using any technically feasible measure of the difference between the output perturbations and the expected output perturbations, such as Euclidean distance or L1 distance.

More formally, subsequent to training the neural fingerprinting ML model, the same predetermined random perturbations may be made to input data x during deployment, with the perturbed input data x+Δ and the output i being fed to the detection model 212 that outputs an adversarial score 214, denoted by s. It should be understood that, as the predetermined perturbations may be chosen randomly, it is computationally expensive for attackers to figure out the perturbations by brute force. Further, the adversarial detection module 210 and the detection model 212 therein are distinct from the ML model 204, unlike conventional neural fingerprinting techniques in which neural fingerprinting was embedded within a ML model itself. Such conventional techniques required knowledge of the ML model, and that the ML model be updated when new adversarial threats arose. By contrast, the adversarial detection module 210 and the detection model 212 therein can be developed independently of the ML model 204, without knowledge of the ML model 204 and without requiring the ML model 204 to be updated in response to new adversarial threats.

Returning to the example of a surrogate ML model, the detection model 212 included in the adversarial detection module 210 may include the surrogate ML model that mimics functionality of the ML model 204. In such a case, internal features extracted by feature extraction layer(s) of the surrogate ML model may be used to build a probabilistic distribution for each class that can be output by the ML model 204 and the surrogate ML model. Thereafter, during deployment, the detection model 212 may compare the features extracted by the surrogate ML model from new input data x with the distribution of the corresponding class i to which the ML model 204 has classified such input data. In some embodiments, such a comparison may be performed using a statistical distance measure such as energy distance, maximum mean discrepancy, etc. It should be noted that use of features extracted by the surrogate ML model, as opposed to features extracted by the ML model 204 itself, is advantageous because, unlike the ML model 204, the surrogate ML model does not include a direct external interface that is accessible to potential attackers. That is, attackers would not even have black-box access to the surrogate ML model included in the adversarial detection module 210. Further, in some embodiments, the surrogate ML model may be "smaller" than the ML model 204, meaning the surrogate ML model can have a less complex model architecture and/or be trained on a smaller set of training data than the ML model 204. A smaller surrogate ML model may be employed, as, unlike the ML model 204, the surrogate ML model is only used to extract features and not required to accurately predict classifications.

Figure 3:
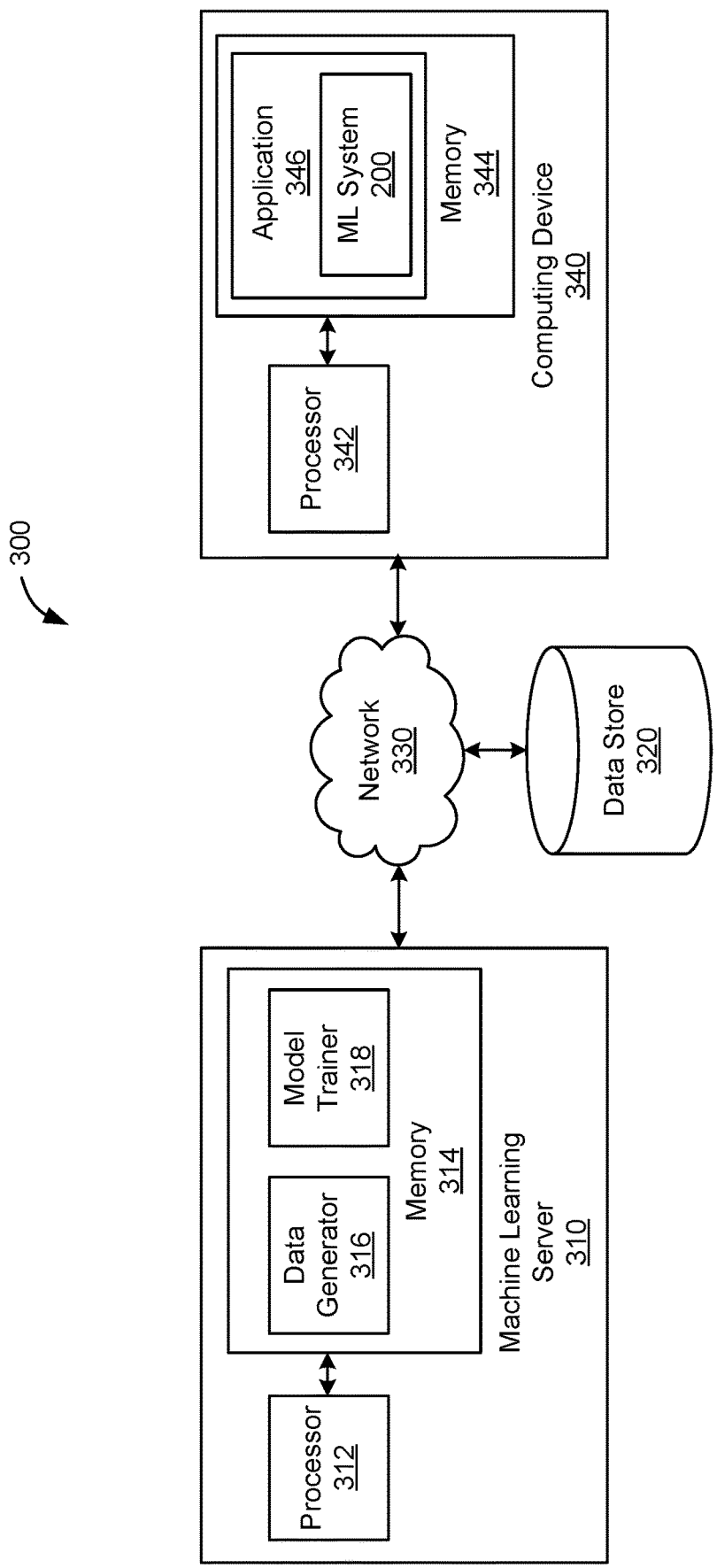
FIG. 3 illustrates a computing system configured to implement one or more aspects of the various embodiments.

FIG. 3 illustrates a computing system 300 configured to implement one or more aspects of various embodiments. As shown, the system 300 includes a ML server 310, a data store 320, and a computing device 340 on which the ML system 200 is deployed in an application 346. Illustratively, the ML server 310, the data store 320, and the computing device 340 are in communication over a network 330. In some embodiments, the network 330 may be a wide area network (WAN) such as the Internet, a local area network (LAN), or any other suitable network. Although shown as communicating over the network 330, the ML system 200 may generally be deployed to any suitable computing system, which may or may not communicate with the ML server 310 and/or the data store 320. For example, the ML system 200 could be deployed in an autonomous vehicle that is not in communication with a ML server.

As shown, a data generating application 316 ("data generator") executes on a processor 312 of the ML server 310 and is stored in a memory 314 of the ML server 310. Although shown as a server for illustrative purposes, it should be understood that the ML server 310 is not required to be a server and may generally be any type of computing system. The processor 312 is included to be representative of a single central processing unit (CPU), multiple CPUs, a single CPU having multiple processing cores, one or more graphics processing units (GPUs), field-programmable gate arrays (FPGAs), other types of processors, some combination of the foregoing, and the like. In operation, the processor 312 may control and coordinate the operations of other system components. The processor 312 may further use input from input devices, such as a keyboard or a mouse.

The system memory 314 of the ML server 310 stores content, such as software applications and data, for use by the processor 312. The system memory 316 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 316. The storage may include any number and type of external memories that are accessible to the PROCESSOR 312. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the ML server 310 shown herein is illustrative and that variations and modifications are possible. For example, the number of processors 312, the number of system memories 314, and the number of applications included in the system memory 314 may be modified as desired. Further, the connection topology between the various units in FIG. 3 may be modified as desired. In some embodiments, any combination of the processor 312 and the system memory 314 may be replaced with any type of virtual computing system, distributed computing system, or cloud computing environment, such as a public or a hybrid cloud.

The data generator may be used to generate training data with which the detection model 212 is trained. Although discussed herein with respect to training the detection model 212, it should be noted that training the detection model 212 may actually include training a ML model (e.g., a neural fingerprinting model or surrogate ML model) included in the detection model 212. Further, data may also be generated and used to train the ML model 204. Any suitable data preparation operations (or no such operations) may be performed to generate training data. Further, the training data may be stored in the data store 320, or elsewhere.

In some embodiments, the data store 320 may include any storage device or devices, such as fixed disc drive(s), flash drive(s), optical storage, network attached storage (NAS), and/or a storage area-network (SAN). Although shown as accessible over the network 130, in some embodiments the ML server 310 may include the data store 320. In some embodiments, the data store 320 may include one or more databases. As such, the system 300 may include a database management system (DBMS) for accessing and storing data in the data store 320.

Based on the training data, a model training application 318 ("model trainer"), which also resides in the memory 314 and executes on the processor 312, trains the detection model 212. In some embodiments, training the detection model 212 may include training a ML model, such as a neural fingerprinting model or a surrogate ML model, that is included in the detection model 212, as described above. Any technically feasible training technique (e.g., back propagation with gradient descent or a modification thereof) may be employed, depending on a type of the detection model 212 and/or the ML model therein. Further, the detection model 212 and/or the ML model therein may be any technically feasible type of ML model, with any suitable architecture, such as a deep learning model, a SVM, a boosted tree, a random forest, a logistic regression model, a linear regression model, etc.

The trained detection model 212 may be stored in the data store 120, or elsewhere. The trained detection model 212 may further be deployed, as part of the adversarial detection module 210, to any technically feasible application(s) to detect adversarial attacks. Examples of such applications include autonomous vehicle applications and malware detection applications. Illustratively, an application 346 that includes the ML 200 and the adversarial detection module 210 (that includes the detection model 212) therein is stored in a memory 344, and executes on a processor 342, of the computing device 340. Components of the computing device 340, including the memory 344 and processor 342 may be similar to corresponding components of the ML server 310, discussed above.

The number of ML servers and computing devices may be modified as desired. In some embodiments, any combination of the processor 342 and the system memory 344 may be replaced with any type of virtual computing system, distributed computing system, or cloud computing environment, such as a public or a hybrid cloud. Further, the functionality included in any of applications may be divided across any number of applications or other software that are stored and executed via any number of devices that are located in any number of physical locations.

Figure 4:
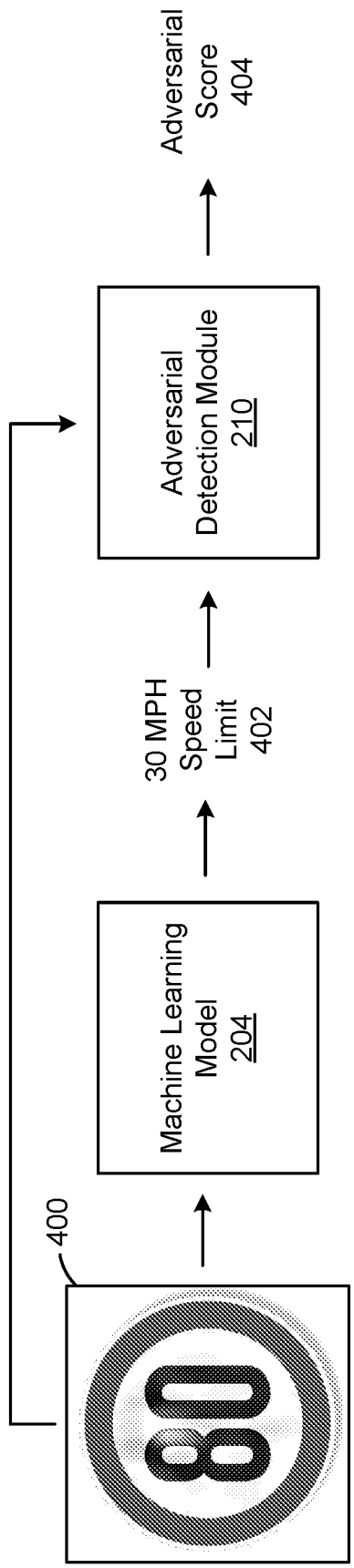
FIG. 4 illustrates an example adversarial attack that is flagged, according to various embodiments.

FIG. 4 illustrates an example adversarial attack that is flagged, according to various embodiments. As shown, the ML system 200 receives sensor data in the form of an adversarial image 400 depicting a traffic sign indicating an 80 miles per hour (mph) speed limit that has been modified such that the ML model 204 misrecognizes the sign as indicating a 30 mph speed limit. The image 400 may be, e.g., a cropped portion of an image captured by a camera mounted on an autonomous vehicle.

Illustratively, the 80 mph speed limit sign in the adversarial image 400 has been subtly modified in a manner that may be imperceptible to humans. For example, a sign could be modified by adding a few small strokes of color to the face of the sign. As shown, the modification to the visual appearance of the 80 mph speed limit sign causes the ML model 204 to misclassify the 80 mph speed limit sign as a 30 mph speed limit sign. To discern such an adversarial attack, the ML system 200 processes the image 400 and the 30 mph speed limit signal output by the ML model 204 using the adversarial detection module 210. As described, the adversarial detection module 210 is configured to predict an adversarial score 404 using, e.g., a neural fingerprinting or statistical technique, and the adversarial score may then be compared to a threshold to determine whether an adversarial flag should be raised (which it would in this example). Further, the adversarial detection module 210 does not include a direct external interface, such as an API, making it difficult for an attacker to compromise the adversarial detection module 210.

Figure 5:
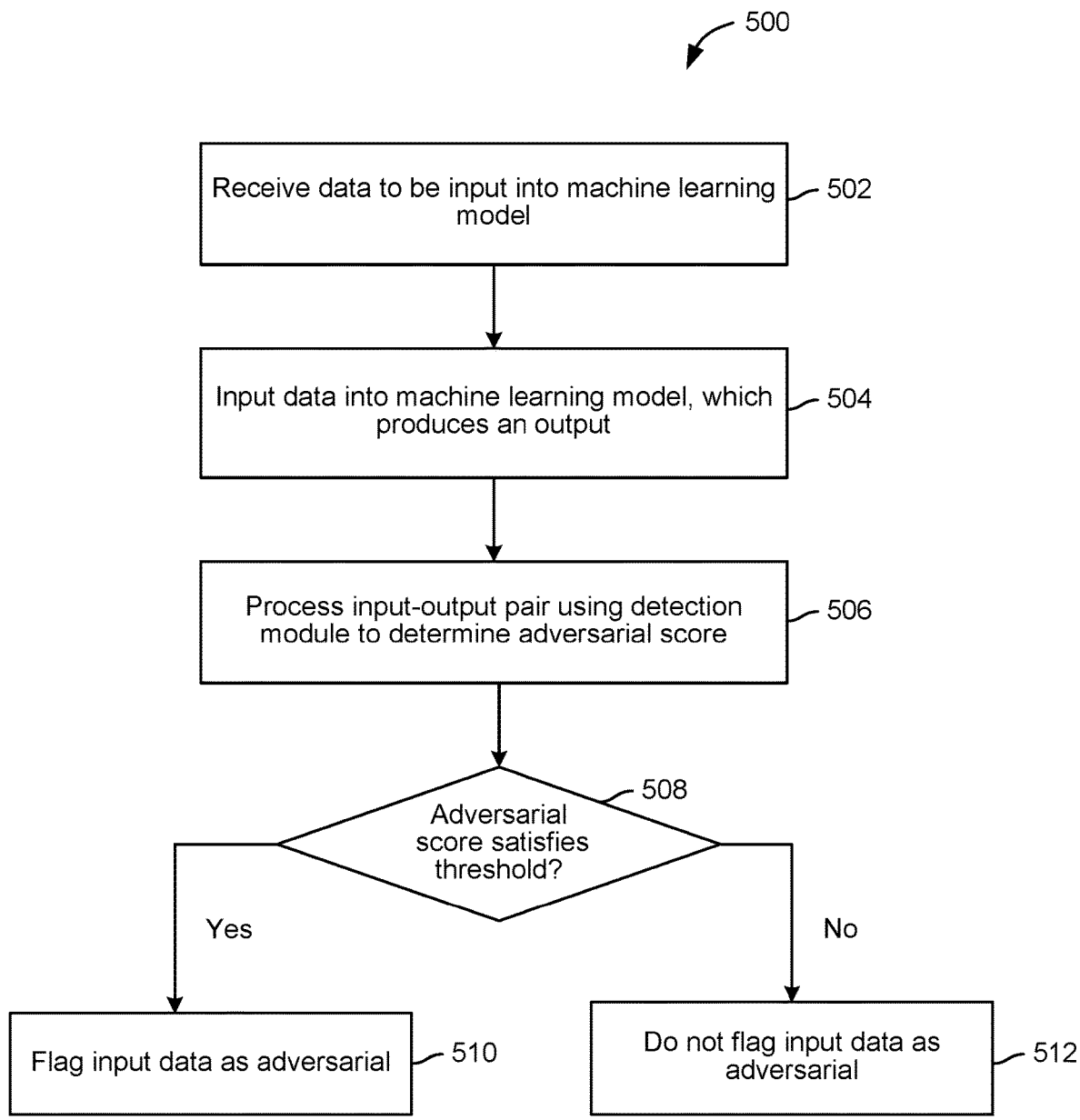
FIG. 5 sets forth a flow diagram of method steps for detecting adversarial attacks, according to various embodiments.

FIG. 5 sets forth a flow diagram of method steps for detecting adversarial attacks, according to various embodiments. Although the method steps are described in conjunction with the systems of FIGS. 2-3, persons of ordinary skill in the art will understand that any system configured to perform the method steps, in any order, is within the scope of the present invention.

As shown, a method 500 begins at step 502, where the ML system 200 receives data to be input into the ML model 204. As described, any suitable data, such as image(s), sound, text, etc., may be input into the model 204, depending on the application, and the input data may be represented by a one- or higher-dimensional set of numbers. For example, in the context of autonomous vehicles, the input data could include images captured by sensors mounted on an autonomous vehicle. Other examples of input data include microphone recordings, thermal camera images, LIDAR data, RADAR data, etc.

At step 504, the ML system 200 inputs the data into the ML model 204, which produces an output. As described, any technically feasible ML model may be used, such as a deep learning model, boosted tree, random forest, logistic regression model, linear regression model, etc., and the ML model may output any suitable prediction. Further, the ML model 204 may be agnostic to and unaffected by the adversarial detection being performed. Returning to the example of autonomous vehicles, a deep learning model may be used to, e.g., classify objects such as traffic signs and pedestrians captured in an image.

At step 506, the adversarial detection module 210 processes the input-output pair associated with the ML model 204 using the detection model 212 to determine an adversarial score. As described, the detection model 212 may output the adversarial score based on how well the input-output pair matches a pattern of data observed during training. In some embodiments, the processing of the input-output pair may include performing a neural fingerprinting technique, as discussed in greater detail with respect to FIG. 6. In some other embodiments, the processing of the input-output pair may include extracting features using a surrogate ML model and comparing the extracted features to a distribution of features associated with the same class to which the ML model 204 classified the input, as discussed in greater detail with respect to FIG. 7.

At step 508, the ML system 200 determines whether the adversarial score output by the adversarial detection module 210 satisfies a predetermined threshold for raising an adversarial flag. If the ML system 200 determines that the adversarial score satisfies the threshold, then at step 510 the ML system 200 flags the original input data as adversarial. The ML system 200, or other software, may further take any suitable remedial action(s) in response to the adversarial flag, such as alerting the user, asking the user to intervene to classify the input, and/or accessing an alternative source of information to classify the input. It should be understood that the remedial action(s) taken may generally depend on the application. Returning to the example of an autonomous vehicle, the ML system 200 could alert a user or access a website such as Google Maps™ and determine, based on crowdsourcing information, the correct classification for a traffic sign or other object.

On the other hand, if the ML system 200 determines that the adversarial score output by the adversarial detection module 210 does not satisfy the predefined threshold, then at step 512, the ML system 200 does not flag the input data as adversarial. Thereafter, the output of the ML model 204 may be used for its intended purpose, which will generally depend on the application. Returning to the example of an autonomous vehicle, the classifications of objects as, e.g., different traffic signs, traffic lights, pedestrians, etc. may be used to determine control signals for operating the autonomous vehicle.

Figure 6:
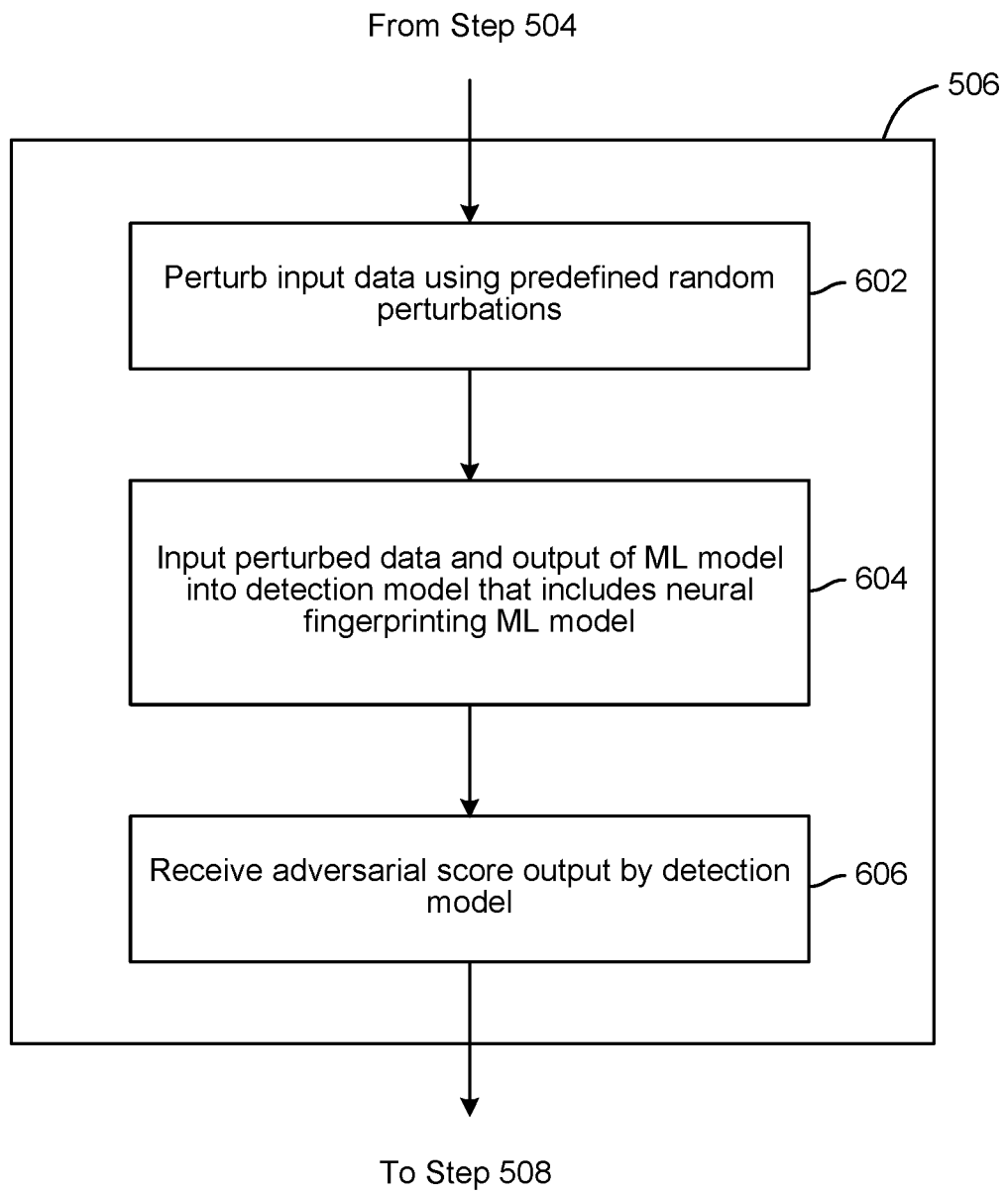
FIG. 6 illustrates in greater detail one of the method steps of FIG. 5, according to various embodiments.

FIG. 6 illustrates in greater detail step 506 of the method 500 shown in FIG. 5, according to various embodiments. Although the method steps are described in conjunction with the systems of FIGS. 2-3, persons of ordinary skill in the art will understand that any system configured to perform the method steps, in any order, is within the scope of the present invention.

As shown, at step 602, the adversarial detection module 210 perturbs the input data using predefined random perturbations. For example, in the case of an image, the ML system 200 could generate multiple (e.g., 100) perturbations of the image by making predefined random changes to pixel values within the image for each of the perturbations, such as adding small numbers to the pixel values at random locations within the image. More generally, any technically feasible perturbations may be made to the input data.

At step 604, the adversarial detection module 210 inputs the perturbed data and the output of the ML model 204 at step 504 into the detection model 212, which in this case includes a neural fingerprinting ML model. The detection model 212 is configured to predict an adversarial score that is indicative of whether the original input data is adversarial and may change in a specific manner based on the true classification of the input data. As described, the adversarial score output by the model 212 that includes a neural fingerprinting ML model is indicative of whether the input perturbations and outputs of the neural fingerprinting ML model matches the fingerprints (and specifically, whether the outputs match the expected output perturbations) for a class predicted by the ML model 204 at step 504, based on a measure of distance such as Euclidean distance or L1 distance.

At step 606, the adversarial detection module 210 receives an adversarial score output by the detection model 212. As described, such an adversarial score may then be compared to a threshold to determine whether an adversarial flag should be raised.

Figure 7:
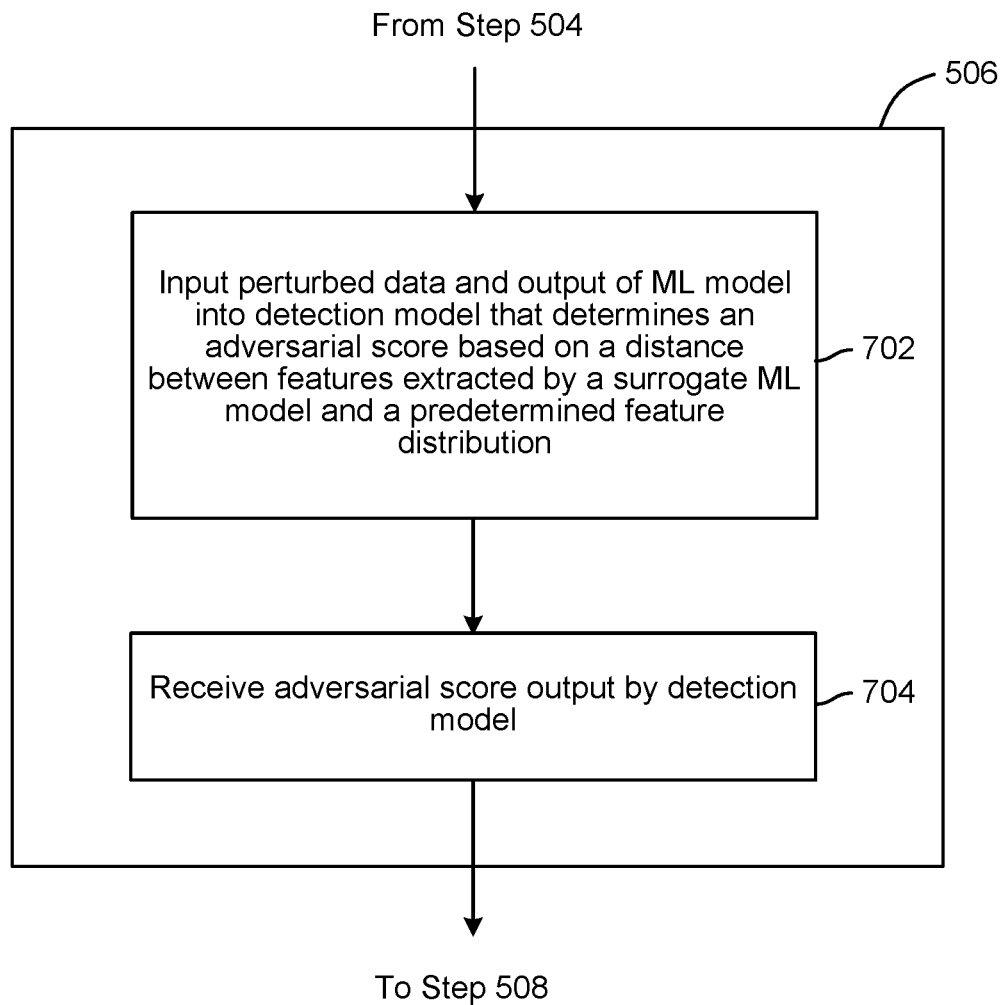
FIG. 7 illustrates in greater detail one of the method steps of FIG. 5, according to alternative embodiments.

FIG. 7 illustrates in greater detail step 506 of the method 500 shown in FIG. 5, according to alternative embodiments. Although the method steps are described in conjunction with the systems of FIGS. 2-3, persons of ordinary skill in the art will understand that any system configured to perform the method steps, in any order, is within the scope of the present invention.

As shown, at step 702, the adversarial detection module 210 inputs the data received at step 502 of the method 500 into the detection model 212, which in this case determines an adversarial score based on a distance between features extracted by a surrogate ML model and a predetermined feature distribution associated with output of the ML model 204 produced at step 504. As described, the surrogate ML model is a model that mimics functionality of the ML model 204 by taking the same types of inputs and predicting the same types of classifications as outputs. For example, in the context of autonomous vehicles, the surrogate ML model could receive as input images and predict objects within the images as being different traffic signs, traffic lights, pedestrians, etc. Using the surrogate ML model, the detection model 212 may determine a distance between the features extracted by the surrogate ML model and a predetermined distribution associated with output of the ML model 204 produced at step 504. For example, in some embodiments, the extracted features may be represented as a histogram, and the detection model 212 may compare such a histogram with another feature histogram corresponding to the output of the ML model 204. In other embodiments, more complex representations than histograms, such as nonparametric distributions or kernel-based distributions, may be used.

As described, during training, internal features extracted by feature extraction layer(s) of the surrogate ML model may be used to build a probabilistic distribution for each class that can be output by the ML model 204. Thereafter, the detection model 212 may use any technical feasible statistical measure of distance, such as energy distance, maximum mean discrepancy, etc., to compare the features extracted by the surrogate ML model from given input data with the probability distribution corresponding to the class to which the ML model 204 classified the given input data. Such a statistical distance may then be output by the detection model 212 as the adversarial score.

At step 704, the adversarial detection module 210 receives an adversarial score output by the detection model 212. As described, such an adversarial score may then be compared to a threshold to determine whether an adversarial flag should be raised.

In sum, techniques are disclosed for detecting adversarial attacks. In the disclosed techniques, a ML system processes the input into and output of a ML model using an adversarial detection module. The adversarial detection module includes a detection model that generates a score indicative of whether the input is adversarial using, e.g., a neural fingerprinting technique or a comparison of features extracted by a surrogate ML model to an expected feature distribution for the output of the ML model. In turn, the adversarial score is compared to a predefined threshold for raising an adversarial flag. Appropriate remedial measures, such as notifying a user, may be taken when the adversarial score satisfies the threshold and raises the adversarial flag.

At least one technical advantage of the disclosed techniques relative to the prior art is that, in the disclosed techniques, an adversarial detection module in a ML system is implemented without a direct external interface. Thus, the adversarial detection module is not accessible outside the ML system. As a result, potential attackers cannot access the adversarial detection module or a detection model within the adversarial detection module, making the adversarial detection module difficult to compromise. Further, the plugin-in nature of the adversarial detection module allows such a module to be deployed to defend a variety of learning-based ML models, while being developed and updated independently of those ML models. In addition, because of the general inaccessibility of the adversarial detection module, the disclosed techniques can be implemented in applications and products where safety and/or security are important, such as autonomous vehicles, malware detection, facial recognition, speaker detection, spam detection in emails, etc.

These technical advantages represent one or more technological improvements over prior art approaches.

1. Some embodiments include a computer-implemented method for detecting adversarial attacks on a machine-learning (ML) system, the method comprising processing data via a ML model included in the ML system to generate output data, and processing, via an adversarial detection module included in the ML system, the data input into the ML model and the output data to determine whether the data input into the ML model is adversarial, wherein the adversarial detection module does not include an interface that is accessible outside of the ML system.

2. The computer-implemented method of clause 1, wherein processing the data input into the ML model and the output data via the adversarial detection module comprises perturbing the data input into the ML model using a set of predefined random perturbations, inputting the perturbed data into a neural fingerprinting model included in the adversarial detection module which generates output perturbations, and determining a difference between the output perturbations and a set of expected output perturbations.

3. The computer-implemented method of any of clauses 1-2, wherein the difference between the output perturbations and the set of expected output perturbations comprises a distance between the output perturbations and the set of expected output perturbations.

4. The computer-implemented method of any of clauses 1-3, further comprising performing one or more remedial actions if the difference between the output perturbations and the set of expected output perturbations satisfies a predefined threshold.

5. The computer-implemented method of any of clauses 1-4, wherein processing the data input into the ML model and the output data via the adversarial detection module comprises extracting, via a surrogate ML model included in the adversarial detection module, features from the data input into the ML model, and determining whether the data input into the ML model is adversarial based on a comparison of the features extracted via the surrogate ML model with an expected feature distribution associated with the output data.

6. The computer-implemented method of any of clauses 1-5, wherein the comparison of the extracted features with the expected feature distribution uses one of an energy distance or a maximum mean discrepancy.

7. The computer-implemented method of any of clauses 1-6, further comprising performing one or more remedial actions if the energy distance or maximum mean discrepancy satisfies a predefined threshold.

8. The computer-implemented method of any of clauses 1-7, wherein the adversarial detection module comprises a software module capable of being implemented in multiple different ML systems without modification.

9. The computer-implemented method of any of clauses 1-8, wherein the data input into the ML model includes at least one of an image, a microphone recording, a thermal camera image, LIDAR (Light Detection and Ranging) data, or RADAR data.

10. The computer-implemented method of any of clauses 1-9, wherein the ML model comprises one of a deep learning model, a support vector machine, a boosted tree, a random forest, a logistic regression model, or a linear regression model.

11. Some embodiments include non-transitory computer-readable storage medium including instructions that, when executed by a processor, cause the processor to perform steps for detecting adversarial attacks on a machine-learning (ML) system, the steps comprising processing data via a ML model included in the ML system to generate output data, processing, via an adversarial detection module that is included in the ML system and does not include an interface accessible outside of the ML system, the data input into the ML model and the output data to determine whether the data input into the ML model is adversarial, and performing one or more remedial actions if the data input into the ML model is determined to be adversarial.

12. The computer-readable storage medium of clause 11, wherein the one or more remedial actions include notifying a user.

13. The computer-readable storage medium of any of clauses 11-12, wherein the one or more remedial actions include classifying the data input into the ML model using a public information source.

14. The computer-readable storage medium of any of clauses 11-13, wherein processing the data input into the ML model and the output data via the adversarial detection module comprises perturbing the data input into the ML model using a set of predefined random perturbations, inputting the perturbed data into a neural fingerprinting model included in the adversarial detection module which generates output perturbations, and determining a difference between the output perturbations and a set of expected output perturbations.

15. The computer-readable storage medium of any of clauses 11-14, wherein processing the data input into the ML model and the output data via the adversarial detection module comprises extracting, via a surrogate ML model included in the adversarial detection module, features from the data input into the ML model, and determining whether the data input into the ML model is adversarial based on a comparison of the features extracted via the surrogate ML model with an expected feature distribution associated with the output data.

16. The computer-readable storage medium of any of clauses 11-15, wherein the surrogate ML model is trained on a smaller set of training data than the ML model is trained.

17. The computer-readable storage medium of any of clauses 11-16, wherein an architecture of the surrogate ML model is less complex than an architecture of the ML model.

18. The computer-readable storage medium of any of clauses 11-17, wherein the comparison of the extracted features with the expected feature distribution uses one of an energy distance or a maximum mean discrepancy, and the one or more remedial actions are performed if the energy distance or maximum mean discrepancy satisfies a predefined threshold.

19. The computer-readable storage medium of any of clauses 11-18, wherein the ML model is agnostic to the adversarial detection module.

20. Some embodiments include a system, comprising a memory storing a machine learning (ML) system comprising a ML model and an adversarial detection module, wherein the adversarial detection module does not include an interface that is accessible outside of the ML system, and a processor that is coupled to the memory and configured to process at least one input into and output of the ML model using the adversarial detection module to determine whether the at least one input into the ML model is adversarial.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

The embodiments of the present disclosure generally provide for a plurality of circuits, electrical devices, and/or at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

A block is understood to be a hardware system or an element thereof with at least one of: a processing unit executing software and a dedicated circuit structure for implementing a respective desired signal transferring or processing function. Thus, parts or all of the system may be implemented as software and firmware executed by a processor or a programmable digital circuit. It is recognized that any system as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any system as disclosed may utilize any one or more microprocessors to execute a computer-program that is embodied in a non-transitory computer readable medium that is programmed to perform any number of the functions as disclosed. Further, any controller as provided herein includes a housing and a various number of microprocessors, integrated circuits, and memory devices, (e.g., FLASH, random access memory (RAM), read only memory (ROM), electrically programmable read only memory (EPROM), and/or electrically erasable programmable read only memory (EEPROM).

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

What is claimed is:

1. A computer-implemented method for detecting adversarial attacks on a machine-learning (ML) system, the method comprising:
   receiving by an ML model of the ML system input data;
   processing by the ML model the input data to generate output data;
   receiving by an adversarial detection module of the ML system both the input data and the output data;
   inputting a perturbed input data and the output data into a neural fingerprinting model included in the adversarial detection module, wherein the perturbed input data is generated by introducing a set of predefined random perturbations into the input data;
   generating by the neural fingerprinting model a perturbed output data based on the perturbed input data;
   determining using the neural fingerprinting model an adversarial score indicating whether the perturbed output data matches an expected perturbed output data for a class of data associated with the input data and the output data; and
   performing one or more remedial actions based on the adversarial score.

2. The computer-implemented method of claim 1, wherein a difference between the perturbed output data and the expected perturbed output data comprises a distance within a feature space between an output perturbation and a corresponding expected output perturbation.

3. The computer-implemented method of claim 1, further comprising performing one or more other remedial actions when a difference between the perturbed output data and the expected perturbed output data satisfies a predefined threshold.

4. The computer-implemented method of claim 1, further comprising:
   extracting, by a surrogate ML model included in the adversarial detection module, features from the input data; and
   the step of determining the adversarial score comprises comparing the features extracted by the surrogate ML model with an expected feature distribution associated with the output data.

5. The computer-implemented method of claim 4, wherein the step of comparing the features extracted by the surrogate ML model comprises determining an energy distance between the extracted features and the expected feature distribution or a maximum mean discrepancy between the extracted features and an expected feature distribution.

6. The computer-implemented method of claim 5, further comprising performing one or more other remedial actions when the energy distance or maximum mean discrepancy satisfies a predefined threshold.

7. The computer-implemented method of claim 1, wherein the adversarial detection module comprises a software module capable of being implemented in multiple different ML systems without modification.

8. The computer-implemented method of claim 1, wherein the input data includes at least one of an image, a microphone recording, a thermal camera image, LIDAR (Light Detection and Ranging) data, or RADAR data.

9. The computer-implemented method of claim 8, wherein the ML model comprises one of a deep learning model, a support vector machine, a boosted tree, a random forest, a logistic regression model, or a linear regression model.

10. A non-transitory computer-readable storage medium including instructions that, when executed by a processor, cause the processor to perform steps for detecting adversarial attacks on a machine-learning (ML) system, the steps comprising:
    receiving by an ML model of the ML system input data;
    processing by the ML model the input data to generate output data;
    receiving by an adversarial detection module of the ML system both the input data and the output data;
    inputting a perturbed input data and the output data into a neural fingerprinting model included in the adversarial detection module, wherein the perturbed input data is generated by introducing a set of predefined random perturbations into the input data;
    generating by the neural fingerprinting model a perturbed output data based on the perturbed input data;
    determining using the neural fingerprinting model an adversarial score indicating whether the perturbed output data matches an expected perturbed output data for a class of data associated with the input data and the output data; and
    performing one or more remedial actions based on the adversarial score.

11. The computer-readable storage medium of claim 10, wherein the one or more remedial actions include notifying a user.

12. The computer-readable storage medium of claim 10, wherein the one or more remedial actions include accessing an alternative source of information to classify the input data.

13. The computer-readable storage medium of claim 10, further comprising:
    extracting, by a surrogate ML model included in the adversarial detection module, features from the input data; and
    the step of determining the adversarial score comprises comparing the features extracted by the surrogate ML model with an expected feature distribution associated with the output data.

14. The computer-readable storage medium of claim 13, wherein the surrogate ML model is trained on a smaller set of training data than the ML model is trained.

15. The computer-readable storage medium of claim 13, wherein an architecture of the surrogate ML model is less complex than an architecture of the ML model.

16. The computer-readable storage medium of claim 13, wherein:
    the step of comparing the features extracted by the surrogate ML model comprises determining an energy distance between the extracted features and the expected feature distribution or a maximum mean discrepancy between the extracted features and the expected feature distribution; and
    the processor is further configured to perform one or more other remedial actions if the energy distance or maximum mean discrepancy satisfies a predefined threshold.

17. The computer-readable storage medium of claim 10, wherein the adversarial detection module determines whether the input data is adversarial independently of a type of the ML model.

18. A system, comprising:
a memory storing a machine learning (ML) system comprising a ML model and an adversarial detection module; and
a processor that is coupled to the memory and configured to, receive by the ML model input data;
   process by the ML model the input data to generate output data;
   receive by the adversarial detection module both the input data and the output data;
   input a perturbed input data and the output data into a neural fingerprinting model included in the adversarial detection module, wherein the perturbed input data is generated by introducing a set of predefined random perturbations into the input data;
   generate by the neural fingerprinting model a perturbed output data based on the perturbed input data;
   determine using the neural fingerprinting model an adversarial score indicating whether the perturbed output data matches an expected perturbed output data for a class of data associated with the input data and the output data; and
   perform one or more remedial actions based on the adversarial score.

19. The computer-implemented method of claim 1, wherein the neural fingerprinting model is different from the ML model.

20. The computer-readable storage medium of claim 10, wherein the neural fingerprinting model is different from the ML model.

\* \* \* \* \*